United States Patent [19]

Miller

[11] 3,911,189

[45] Oct. 7, 1975

[54] FLAMEPROOFING OF FABRICS

[75] Inventor: George T. Miller, Lewiston, N.Y.

[73] Assignee: Hooker Chemicals & Plastics Corporation, Niagara Falls, N.Y.

[22] Filed: May 18, 1973

[21] Appl. No.: 361,706

[52] U.S. Cl. ............... 428/272; 260/953; 427/342; 428/290; 428/474; 428/538; 428/921
[51] Int. Cl.² .......................................... C09K 3/28
[58] Field of Search ............ 117/136, 137, 138.8 N; 106/15 FP; 252/8.1; 260/953

[56] References Cited
UNITED STATES PATENTS

| | | | |
|---|---|---|---|
| 3,369,060 | 2/1968 | Pelletier et al. | 117/136 |
| 3,436,250 | 4/1969 | Yamaguchi et al. | 117/136 |
| 3,474,046 | 10/1969 | Pelletier et al. | 260/953 |
| 3,530,205 | 9/1970 | Patton et al. | 260/953 |
| 3,822,327 | 7/1974 | Weil | 117/136 |

Primary Examiner—Daniel J. Fritsch
Attorney, Agent, or Firm—Peter F. Casella; William J. Crossetta, Jr.

[57] ABSTRACT

Normally flammable textile fabrics composed of polyamides such as polyhexamethylene adipamides, polycaproamides, poly(m-phenyleneisophthalamides) and the like, are rendered highly flameproof by the intimate association therewith of a flameproofing amount of the reaction product of aqueous phosphoric acid or an acid ammonium phosphate and an alkylene oxide, e.g., ethylene oxide. Amounts of said reaction product of at least, and preferably in excess of 0.5 percent OWF (on the weight of the fiber) increase the Oxygen Index of the treated fabrics to over 40. Preferably the reaction product is rendered neutral before or after application to the fabric and the treated fabrics are non-corrosive, non-irritating in nature, and have a pleasant hand.

13 Claims, No Drawings

FLAMEPROOFING OF FABRICS

FIELD OF INVENTION

This invention relates to improvements in the flameproofing of normally flammable fabrics. More particularly it relates to the treatment of normally flammable fabrics composed of certain synthetic polymers and especially it relates to fabrics composed of poly(m-phenyleneisophthalamides) which have been treated to increase the Oxygen Index of said fabrics to at least 40.

BACKGROUND OF THE INVENTION

Apparel for use in applications where under emergency conditions a hazardous thermal environment might exist should satisfy the following minimum requirements.

a. The fabric from which the apparel is made should be resistant to burning, melting or disintegration on exposure to open flames or elevated temperatures.

b. The fabric should possess good dimensional stability on exposure to elevated thermal conditions since large thermal shrinkages tend to restrict mobility of the wearer.

c. The apparel should function as an effective thermal barrier in order to prevent severe skin burns, and d. The garments should be durable, non-irritating, and comfortable to encourage their use.

It is known to treat normally flammable textile materials, of both natural and synthetic nature, with chemicals such as triammonium phosphate, tetrakis(hydroxymethyl) phosphonium oxides and polymers thereof, and the like to render them fire retardant. Such treatments while effective for rendering fabrics fire retardant under normal conditions of use, such as fabrics designed for use as curtains, rugs, sweaters and the like, are not satisfactory for use under emergency or highly hazardous conditions as in aviators' flying suits or apparel designed for use in oxygen enriched atmospheres.

Synthetic materials, such as polybenzimidazoles and polyamides such as poly(m-phenyleneisophthalamides) which exhibit improved heat resistance compared to other synthetics such as polypropylene and polyamides such as polyhexamethyleneadipamides and polycaproamides are known and these improved fibers have replaced the more conventional fire retardant materials in many special applications. In copending application Ser. No. 230,999, filed March 1, 1972, now abandoned it is disclosed that normally flammable fabrics such as polypropylene and polyamides could be rendered flameproof by the intimate association therewith of a flameproofing amount of a phosphoric acid. Such treated fabrics, although substantially improved with respect to their resistance to the propagation of flames, are somewhat corrosive to metals and tend to cause irritation to the skin of those wearing clothing fabricated from such treated fabrics. In copending application Ser. No. 337,349, filed March 2, 1973, it was disclosed that normally flammable polyamide fabrics could be rendered flameproof and non-irritating by the intimate association therewith of a flameproofing amount of an ammonium acid phosphate. Such treated fabrics although substantially improved with respect to their non-irritating character tend to deposit crystals of the ammonium phosphate, unless great care is observed in the application thereof, and thereby affect the hand of the treated fabric. Accordingly a need still exists for a fiber with thermal characteristics superior to those of the aforementioned fibers, which are non corrosive and non-irritating in character, and which have a pleasant hand.

OBJECTS OF THE INVENTION

It is, therefore, a principal object of this invention to devise improved flameproofed textile fabrics comprising normally flammable synthetic materials.

Another object is to provide a process for treating normally flammable synthetic materials to render them non-corrosive and non-irritating as well as flameproof.

A particular object is to devise compositions of normally flammable synthetic materials comprising an effective flameproofing amount of a reaction product of aqueous phosphoric acid and an alkylene oxide intimately associated therewith.

These and other objects of the present invention will be obvious from the following description.

BRIEF SUMMARY OF THE INVENTION

In accordance with the present invention, normally flammable fabrics of synthetic polymers are rendered highly flameproof by intimately admixing the fabric with an effective flameproofing amount of a reaction product of aqueous phosphoric acid and an alkylene oxide. The resultant treated fabric is not only surprisingly fire proof, non-corrosive, non-irritating in character, but also has a pleasant hand.

By "effective flameproofing amount" is meant that amount of the said reaction product which suffices to increase the Oxygen Index of the treated material to 40 or above.

By the term "Oxygen Index" it is intended to define the percentage concentration of oxygen in a mixture of oxygen and nitrogen which will maintain equilibrium burning conditions, i.e., the heat produced during combustion just balances the heat lost to the surroundings. Physically, the Oxygen Index is the lowest concentration of oxygen, in an atmosphere of oxygen and nitrogen, which will support sustained combustion of the material and is calculated from the following equation $$\text{Oxygen Index} = \frac{100 \times O_2}{O_2 + N_2}$$

where $O_2$ is the oxygen concentration at equilibrium and $N_2$ is the associated nitrogen concentration. (See "The Oxygen Flame Flammability Test," J. L. Isaacs, J. Fire and Flammability, Vol. 1 (January 1970) page 36 et seq.)

In practice of the present invention, the materials treated may be formed in whole or in part of the normally flammable synthetic polymer material and may be in various forms including yard or sheet goods, as well as various finished articles, such as articles of clothing including coats, shirts, trousers, skirts, jump suits, gloves, and the like. The materials may be woven, non woven, knitted, and the like. Accordingly although, hereinafter primary reference will be made to the treatment of fibrous woven synthetic polymer yard goods, this is not to be taken as a limitation as other forms of synthetic polymer materials, such as non-woven, films, foils, sheets, fibers and yarns, may, in many instances, be utilized as the materials treated in accordance with the present invention.

DETAILED DESCRIPTION OF THE INVENTION

In accordance with a preferred mode of carrying out the present invention normally flammable synthetic polymers, such as polycaproamides, polyhexamethylene adipamides and poly(m-phenyleneisophthalamides) are intimately associated with an effective flameproofing amount of a reaction product of aqueous phosphoric acid and an alkylene oxide. Thereafter the treated material is contacted with an alkaline material, e.g., ammonia, ammonium hydroxide, etc. to render the fabric substantially neutral in reaction, i.e. a pH of about 7. Alternatively, the reaction product prior to association with the flammable polymer material may be neutralized and used thereafter as a neutral solution.

The flameproofing treatment of this invention can be accomplished by several means. For example the synthetic material, in the fibrous or woven condition, can be immersed, padded, sprayed, or dipped in or with an aqueous solution of said reaction product, the thoroughly wetted material dried to remove excess moisture and, then exposed to gaseous ammonia vapors until the material reacts neutral. The treated fabric may be heated to below the decomposition point of the synthetic polymer without significant effect on the treatment.

Alternatively, the material can be treated with an aqueous solution of neutralized reaction product to thoroughly impregnate the material. Thereafter the treated material containing a flame-proofing amount of the neutralized reaction product can be dried in a conventional manner.

The reaction product used in the process of this invention is a complex mixture of unknown composition and is obtained by reacting an alkylene oxide, e.g., ethylene oxide, 1,2-propylene oxide, 2,3-butylene oxide and the like, with an aqueous solution of a phosphoric acid, such as ortho-phosphoric acid, meta-phosphoric acid, pyrophosphoric acid and the like.

The preferred reactants are ortho-phosphoric acid, because of its general availability, overall effectiveness and low cost, and ethylene oxide because of its general overall effectiveness and low cost.

To carry out the preparation of the reaction product, aqueous phosphoric acid, containing from about 5 to about 85 percent by weight of phosphoric acid is placed in a suitable reactor which may be equipped with an agitator and the alkylene oxide, preferably ethylene oxide bubbled into the mass. The initial exothermic reaction is controlled by cooling the mixture and/or by adjusting the rate of addition of the alkylene oxide. The reaction temperature is adjusted to from about 0° to about 100° centigrade and preferably 10°–80°C and an amount of alkylene oxide which is from about one half to one and one half times the weight of 100 percent phosphoric acid, preferably from about one to about one and one half times the weight of phosphoric acid is added. The resultant solution can be used directly or preferably it is neutralized to a pH of about 6.8 to about 7.5 with ammonia or other alkaline reacting substances although, if desired, a higher pH solution can be used.

Alternatively, an aqueous solution of an acid ammonium phosphate can be used in place of the aqueous phosphoric acid reactant, and this solution caused to react with an alkylene oxide under similar conditions.

The resulting reaction product is a rather complex mixture which does not crystallize or if crystals do form they are rather minimal in amount. Thus the reaction product is a liquid to a fluid slurry even after drying. The product is substantially neutral or can be rendered neutral in situ or after application to the fiber. Such a composition is emminently advantageous since it can be more effectively applied and distributed throughout the material treated than a composition which crystallizes on drying and thus deposits isolated crystals on the material and thereby affects the hand of the treated material.

Although I do not wish to be bound by any theory or explanation of the reactions which take place during the formation of the reaction product of the aqueous phosphoric acid and alkylene oxide, it is believed that when using for example ethylene oxide and orthophosphoric acid, a major amount of a hydroxyethyl ester or orthophosphoric acid is formed together with lesser amounts of ethylene glycol and other phosphorus containing organic compounds. Also there may be more or less amounts of unreacted phosphoric acid ions present, which upon neutralization with, e.g., ammonium hydroxide, form ammonium phosphates. Such a complex mixture, fortuitously resists crystallization even when dried too a very low water content and thus provides not only an effective flameproofing agent, but also a non-irritating (i.e. non-acidic) agent which can be applied to fibrous textiles and dried thereon without affecting the hand of the treated material.

Any of the inorganic phosphoric acids can be used. Thus ortho, meta-, or pyrophosphoric acids and mixtures thereof are contemplated for use in the process of the present invention. Orthophosphoric acid because of its general availability and effectiveness is preferred.

Although the flameproofing treatment of this invention initially results in fabrics having an Oxygen Index of at least 40, this value has been found to decrease as a result of repeated washing of the treated fabric. It has been found, as disclosed in the above noted copending applications, that the treatment in accordance with this invention can be stabilized, that is flameproofing treatment can be rendered more fast to washing, by applying to the treated material a coating of synthetic resin material, having an Oxygen Index of at least 40. Such a resin is for example polyvinylidene chloride. Perfluorinated organic polymers, such as Teflon, can be used also.

It has thus been found that by dipping, immersing, spraying, roller coating or otherwise applying to the surface of a treated synthetic polymer material of this invention a solvent solution of polyvinylidene chloride or the like polymer, and evaporating the solvent, a coating of the resin is applied to the surface of the treated polymer material and the flameproofing character of the treated material is thereby rendered more fast to washing.

Solvents suitable for use in this manner, include by way of examples such solvents as dioxane, cyclohexanone, tetrahydrofuran, dimethylformamide and ethylacetate.

The following examples will illustrate the present invention. Parts and percentages are by weight and temperatures are given in degrees centigrade unless otherwise specified.

EXAMPLE I

A. Preparation of Reaction Product of 10% Aqueous Phosphoric Acid and Ethylene Oxide To solution of 10 parts of anhydrous orthophosphoric acid and 90 parts of water, 15 parts of ethylene oxide was bubbled into the solution at a rate such that the temperature did not exceed about 50°. The reaction mixture was agitated for about 5 minutes and then it was rendered neutral (pH of 7) by the addition of ammonium hydroxide.

B. Preparation of Reaction Product of 85% Aqueous Phosphoric Acid and Ethylene Oxide In an analogous manner to that described in Part A above, 236 parts of 85 percent orthophosphoric acid (200 parts, 100 percent) were reacted with ethylene oxide. The temperature of the reaction mixture rose to about 100°, at which point the rate of addition of ethylene oxide was reduced and the reaction mass was cooled with water to about 60°. The addition of ethylene oxide was continued at a rate such that the temperature of the mixture was maintained at about 60°. After 3 hours, 190 parts of ethylene oxide had been reacted with the phosphoric acid. The reaction product thus contained 44.7 percent ethylene oxide.

EXAMPLE II

A strip measuring about 2 ½ inches by eight inches of a white woven poly(m-phenyleneisophalamide) fabric was wetted with the neutral reaction product prepared as described in Example I, part A above, by placing about 20 parts of the neutral reaction product on the strip and spreading it over the strip with a stainless steel spatula until substantially complete wetting of the strip was obtained. The excess liquor was removed by squeezing the wetted material. The wetted strip was dried in an oven at 80° for about one half hour. The add-on, measured as quickly as possible after removal from the oven to minimize moisture pick-up from the atmosphere, was 8.5 percent OWF (on weight of the fabric).

The Oxygen Index of the treated fabric was 58. (O.I. of untreated material is 28±1). The treated material had a smooth pleasant hand, indicating an absence of crystals, and was non-irritating to the skin.

EXAMPLE III

The reaction product of 85% aqueous phosphoric acid and ethylene oxide prepared as described in Example I, Part B above, was rendered neutral to Hydrion Test Paper (pH 7) and to pH 6.9 on Accutint No. 100 paper (range 5.3–7.0) by the addition of 28 percent aqueous ammonium hydroxide.

A strip measuring two and one half inches by eight inches of white woven poly(m-phenyleneisophthalamide) fabric was immersed in the neutral reaction product and the wet strip was dried in an 80° oven for one half hour. The material was only partially dried, had an add on of 32 percent OWF and had a pleasant hand. The Oxygen Index of the treated fabric was 65.

A second strip of the same material was also immersed in the neutral reaction product, but upon removal from the bath and prior to placing in the oven, the wetted strip was placed between paper towels to remove the excess liquor, and then pressed between dry paper towels to remove as much of the liquor as possible. After drying in the oven the treated strip had an add-on of 10.8 percent. The hand of this strip was excellent and its Oxygen Index was 59.

The latter treatment was repeated using the neutral reaction product of 10 percent aqueous phosphoric acid and ethylene oxide prepared as described in Example I Part A above. The add-on of the dried treated strip was 2.82 percent OWF and its hand was excellent. The Oxygen Index of this strip was 52.

In an analogous manner two strips of woven poly(m-phenyleneisophalamide) fabric were treated with the neutral reaction product of 10 percent phosphoric acid and ethylene oxide (4 parts diluted with 4 parts of water and 4 parts diluted with 12 parts of water) to obtain, after pressing between paper toweling as described above and drying add-on of 1.6 percent and 0.73 percent respectively. The dried strips possessed excellent hand, i.e., they were free from boardiness due to deposited crystals, and were non-irritating to the skin. The Oxygen Indexes of the treated strips were 48 (1.6 percent add-on) and 43 (0.73 percent add-on).

The invention has been described in the above specification and illustrated by reference to specific embodiments in the illustrative examples. However it is to be understood that it is not to be so limited since changes and alterations in the specific details disclosed hereinabove may be made without departing from the scope or spirit of the invention disclosed herein.

What is claimed is:

1. A flameproof synthetic fibrous material comprising a normally flammable synthetic material selected from the group consisting of poly(hexamethyleneadipamide), polycaproamide, and poly(m-phenyleneisophthalamide), which material contains a flame retardant amount of the reaction product of an aqueous solution of orthophosphoric acid containing from about 1 to about 85% by weight orthophosphoric acid and at least one alkylene oxide selected from the group consisting of ethylene oxide, propylene oxide and butylene oxide, the weight ratio of alkylene oxide to $H_3PO_4$ in said reaction product being 0.5–1.5:1.

2. Flameproofed synthetic fibrous material as claimed in claim 1 wherein the material comprises at least 0.5 percent by weight of said reaction product, which has been neutralized by ammonia.

3. Flameproofed synthetic fibrous material as claimed in claim 2 wherein the material comprises from about 0.73 to about 32 percent by weight of said reaction product.

4. Flameproofed synthetic fibrous material as claimed in claim 2 wherein the alkylene oxide is ethylene oxide.

5. Flameproofed synthetic material as claimed in claim 2 wherein the synthetic material is poly(m-phenyleneisophthalamide).

6. A process which comprises the steps of treating a normally flammable synthetic polymer material selected from the group consisting of poly(hexamethyleneadipamide), polycaproamide, and poly(m-phenyleneisophthalamide) with the reaction product of aqueous orthophosphoric acid containing from about 1 to about 85 percent by weight orthophosphoric acid and at least one alkylene oxide selected from the group consisting of ethylene oxide, propylene oxide and butylene oxide, the weight ratio of alkylene oxide to $H_3PO_4$ in said reaction product being 0.5–1.5:1 and depositing an flame retarding amount of said reaction product on the polymer material.

7. The process as described in claim 6 wherein the polymer is poly(m-phenyleneisophthalamide).

8. The process as described in claim 7 wherein the treated material has an Oxygen Index of at least about 40.

9. The process as described in claim 8 wherein the treated material has an Oxygen Index of from 43 to about 65.

10. The process which comprises the steps of
 a. applying to a normally flammable synthetic polymer material selected from the group consisting of polyhexamethylene adipamide, polycaproamide, and poly(m-phenyleneisophthalamide) a fire retardant amount of a reaction product of aqueous phosphoric acid and an alkylene oxide, said reaction product having been obtained by reacting an aqueous solution of orthophosphoric acid containing from about 1 to about 85 weight percent of orthophosphoric acid with an amount of alkylene oxide which is about 0.5 to 1.5 times the weight of 100 percent orthophosphoric acid present and thereafter neutralizing the resultant reaction product with ammonia and
 b. drying the treated synthetic polymer material.

11. The process as claimed in claim 10 wherein the normally flammable synthetic polymer material is poly(m-phenyleneisophthalamide).

12. The process as claimed in claim 11 wherein the alkylene oxide is ethylene oxide.

13. The process of claim 10 wherein the treated material contains about 0.73 to about 32 percent by weight of the reaction product.

* * * * *